United States Patent [19]

Shirley

[11] Patent Number: 4,642,770

[45] Date of Patent: Feb. 10, 1987

[54] VEHICLE ACCESSORY CONTROL SYSTEM

[75] Inventor: Ralph E. Shirley, Waterloo, Iowa

[73] Assignee: Deere & Company, Moline, Ill.

[21] Appl. No.: 724,427

[22] Filed: Apr. 18, 1985

[51] Int. Cl.$^4$ .......................... G05D 23/00; B60H 1/32
[52] U.S. Cl. ....................................... 364/424; 62/133; 62/230; 165/42
[58] Field of Search ............... 364/418, 424, 557, 558; 340/52 R, 57; 165/12, 42–43; 62/133, 230, 231, 243, 323.1, 323.4

[56] References Cited

U.S. PATENT DOCUMENTS

| | | | |
|---|---|---|---|
| 4,226,090 | 10/1980 | Horian | 62/133 |
| 4,325,330 | 4/1982 | Kugler et al. | 62/243 |
| 4,358,936 | 11/1982 | Ito et al. | 165/43 |
| 4,365,663 | 12/1982 | Inoue et al. | 165/12 |
| 4,448,035 | 5/1984 | Moriyama et al. | 62/231 |
| 4,451,741 | 5/1984 | Brower | 307/10 R |
| 4,486,837 | 12/1984 | Kohima et al. | 364/424 |
| 4,582,124 | 4/1986 | Yoshimi et al. | 62/323.4 |

FOREIGN PATENT DOCUMENTS 56-71612  6/1981  Japan .
58-33514  2/1983  Japan .

*Primary Examiner*—Gary Chin

[57] ABSTRACT

A control system for engine-driven vehicle accessories generates sets of values representing a recent history of the engine loading and of the operational status of the accessories. History factors are derived from the sets of values. The accessories are controlled as a function of sensed parameters and of comparisons between the history factors. The sets of values are periodically updated.

17 Claims, 7 Drawing Figures

VEHICLE ACCESSORY CONTROL SYSTEM

BACKGROUND OF THE INVENTION

The present invention relates to control system for controlling the operation of one or more vehicle accessories, such as an air conditioner.

Typically, air conditioning compressors are controlled as a function of the sensed temperature in the operator's compartment. When the sensed temperature rises above a preset high limit, the compressor clutch is engaged. When the sensed temperature falls below a low limit, the compressor clutch is disengaged. When the compressor is operating, it reduces the peak power available from the engine for other useful work. This reduces the productivity of the machine. The cycling of the compressor increases the load variance of the engine, thereby reducing the durability life of the engine.

Devices are available which disengage an air conditioning compressor clutch during periods of peak engine load, as sensed by an engine load sensor. One such device is known as the "Passmaster". The "Passmaster" includes a vacuum-operated switch which is attached to the manifold vacuum port on a gasoline engine. A problem associated with the "Passmaster" device is that the compartment temperature may exceed what is desired if the engine load persists above the preset limit of the switch. Another problem of systems with a preset load limit is that such systems do not anticipate changing load cycles and do not operate to minimize variance in engine loading.

SUMMARY OF THE INVENTION

An object of this invention is to provide a vehicle accessory control system which is responsive to a loading cycle of the engine.

Another object of the present invention is to provide a vehicle air conditioning control system which is responsive to load cycling of the engine and to the temperature of the controlled environment.

Another object of this invention is to provide a vehicle accessory control system which operates to reduce variations in engine loading.

These and other objects are achieved by the present invention which includes an engine load sensor, an engine coolant sensor, a cab temperature sensor, a cab temperature setting device, an accumulator pressure sensor and a battery voltage sensor. Signals from these sensors are received by an electronic control unit (E.C.U.) which generates control signals. The control signals are applied to electromagnetic clutches for the air conditioning compressor, the engine cooling system fan, the air compressor, and to a switch for controlling energization of the alternator field winding. The E.C.U. stores sets of values which represent the recent history of the engine loading, the recent history of the engagement status of the electromagnetic clutches and of the energization status of the alternator field winding. The E.C.U. derives factors from each of these sets of historical values. The control signals are a function of the sensed parameters and of comparisons between the derived factors.

DETAILED DESCRIPTION

Figure 1:
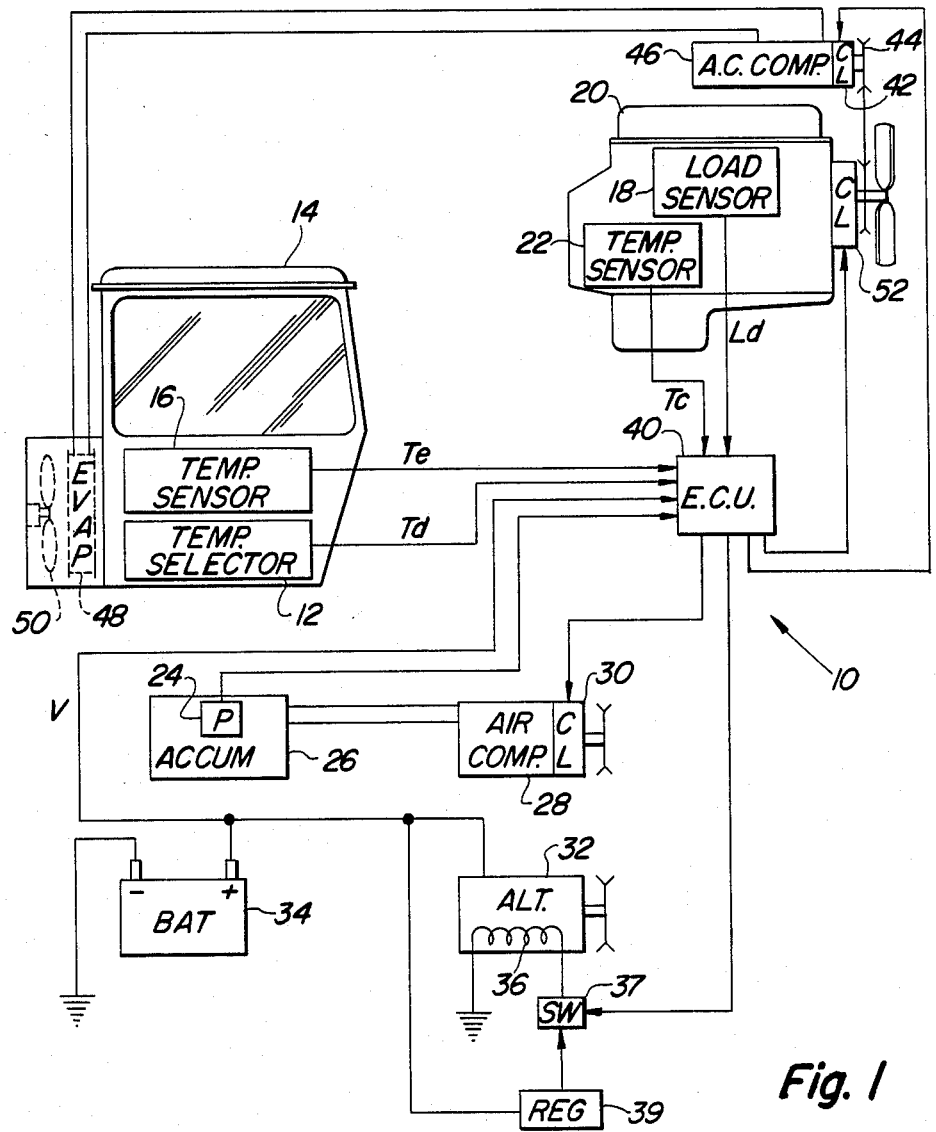
FIG. 1 is a schematic diagram of an accessory control system according to the present invention.

The control system 10 includes an adjustable temperature setting device 12 which the operator sets to the desired temperature Td in the controlled environment of the vehicle cab or compartment 14 and a temperature sensor 16 for sensing the ambient temperature Te of the controlled environment in the cab 14. An engine load sensor 18 (such as a rack position sensor on a diesel engine, a manifold vacuum pressure sensor on carburated engines or a fuel flow sensor) senses the load Ld on engine 20.

Also included is a temperature sensor 22 for sensing the temperature, Tc, of the coolant in the engine 20. A pressure sensor 24 senses the air pressure in accumulator 26. Accumulator 26 is pressurized by air compressor 28 which may be belt-driven via an electromagnetically controlled clutch 30. A belt-driven alternator 32 charges a battery 34 when the alternator field winding 36 is energized.

The signals from sensors 12, 16, 18, 22 and 24 and the battery voltage, V, are received by electronic control unit (E.C.U.) 40. Preferably, the E.C.U. could include a single chip microprocessor, such as described in U.S. Pat. No. 4,358,936, issued in 1982 to Ito et al. The E.C.U. 40 generates control signals which are applied to an electromagnetic clutch 42 which is coupled to an engine-driven belt drive 44 and to an air conditioning compressor 46 which flows refrigerant through an evaporator 48. A fan 50 drives air past the evaporator 48 to cool and condition the interior of the vehicle compartment 14. Control signals are also applied to electromagnetic clutch 52 which drives belt drive 44 and to air compressor electromagnetic clutch 30. Finally, E.C.U. 40 is connected to control the energization of the alternator field winding 36 via a solid state switch 37 connected in series between the ungrounded side of coil 36 and a conventional field coil regulator circuit 39.

Figure 2A:
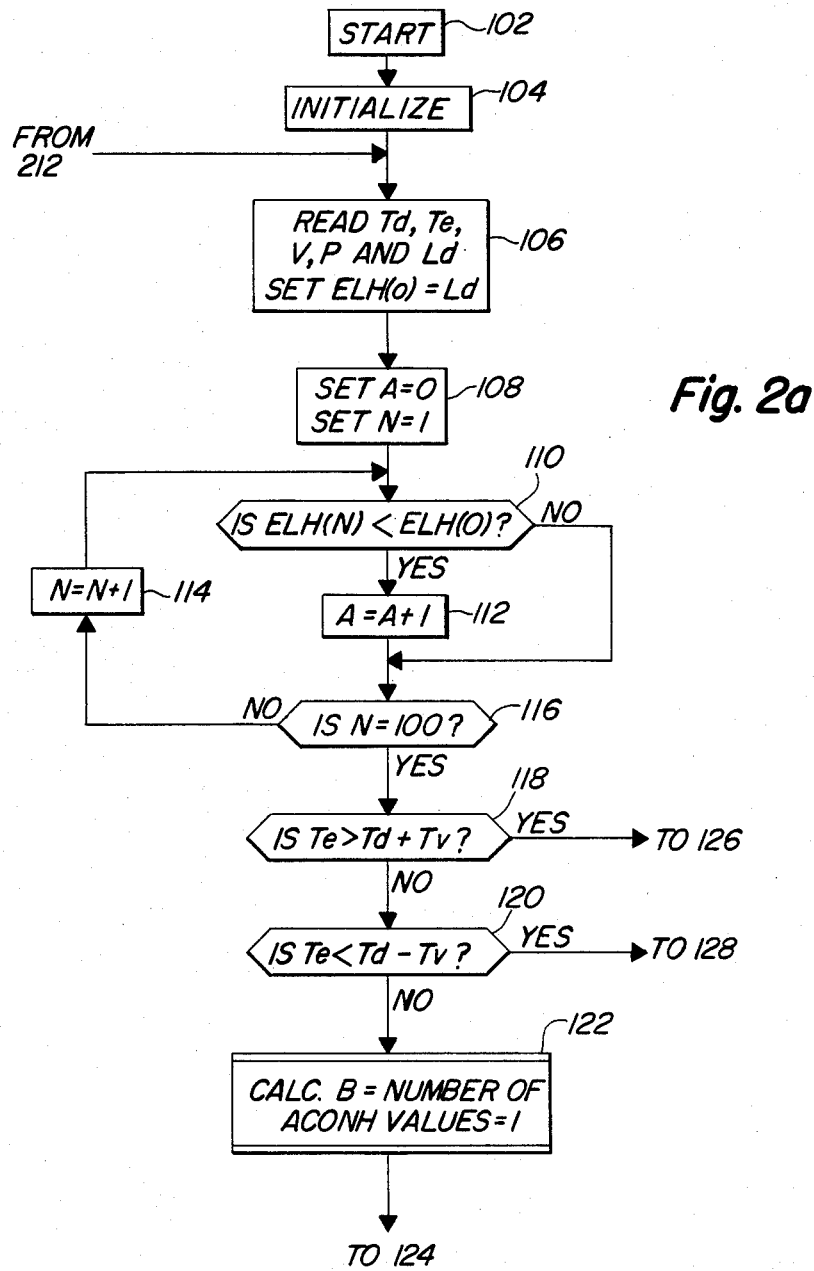
FIGS. 2a-2f are logic flow diagrams of the algorithm executed by the electronic control unit of FIG. 1.
Figure 2B:
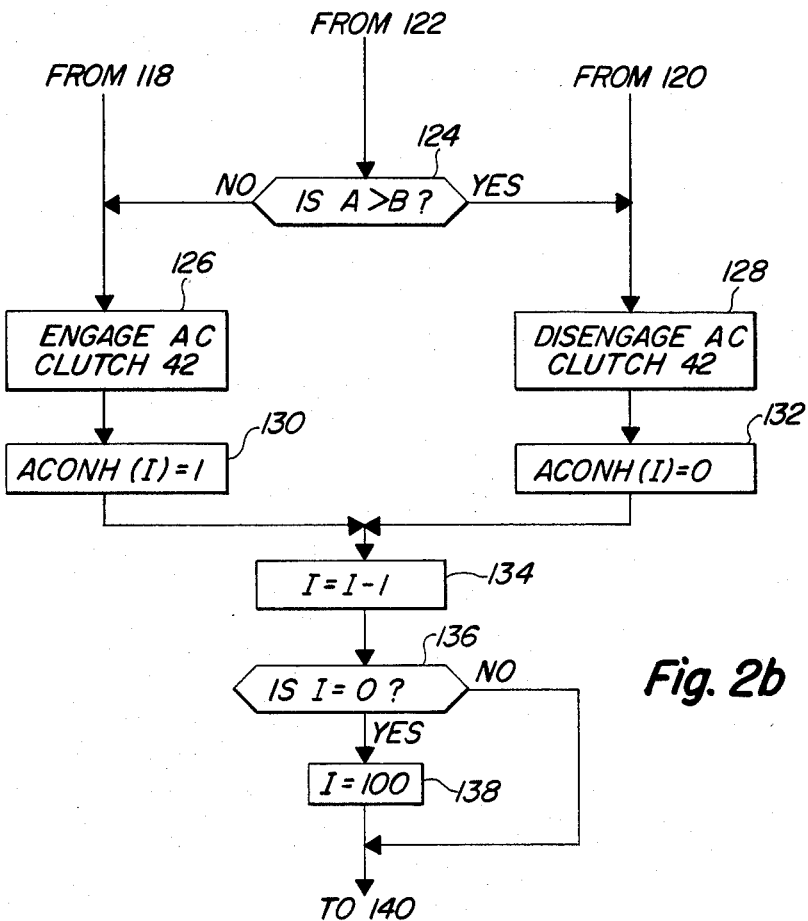
Figure 2C:
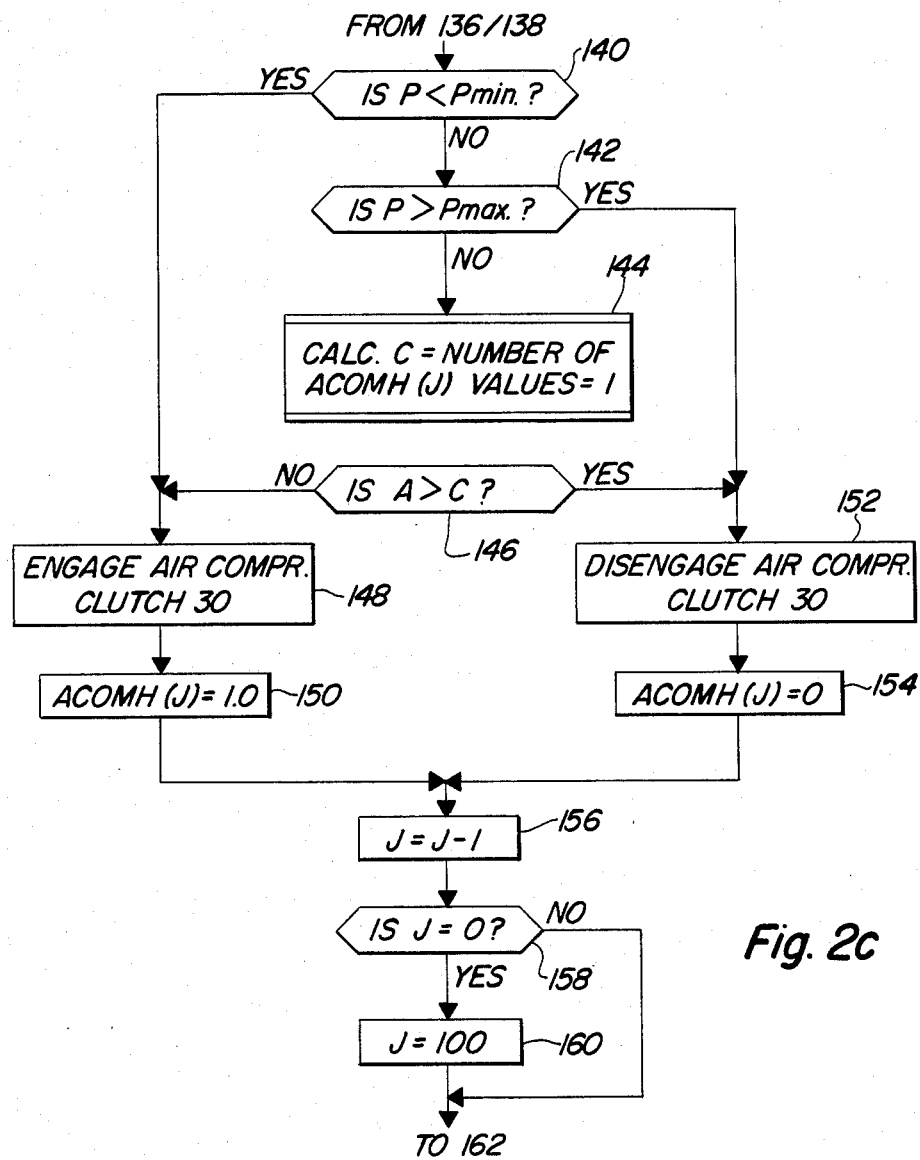
Figure 2D:
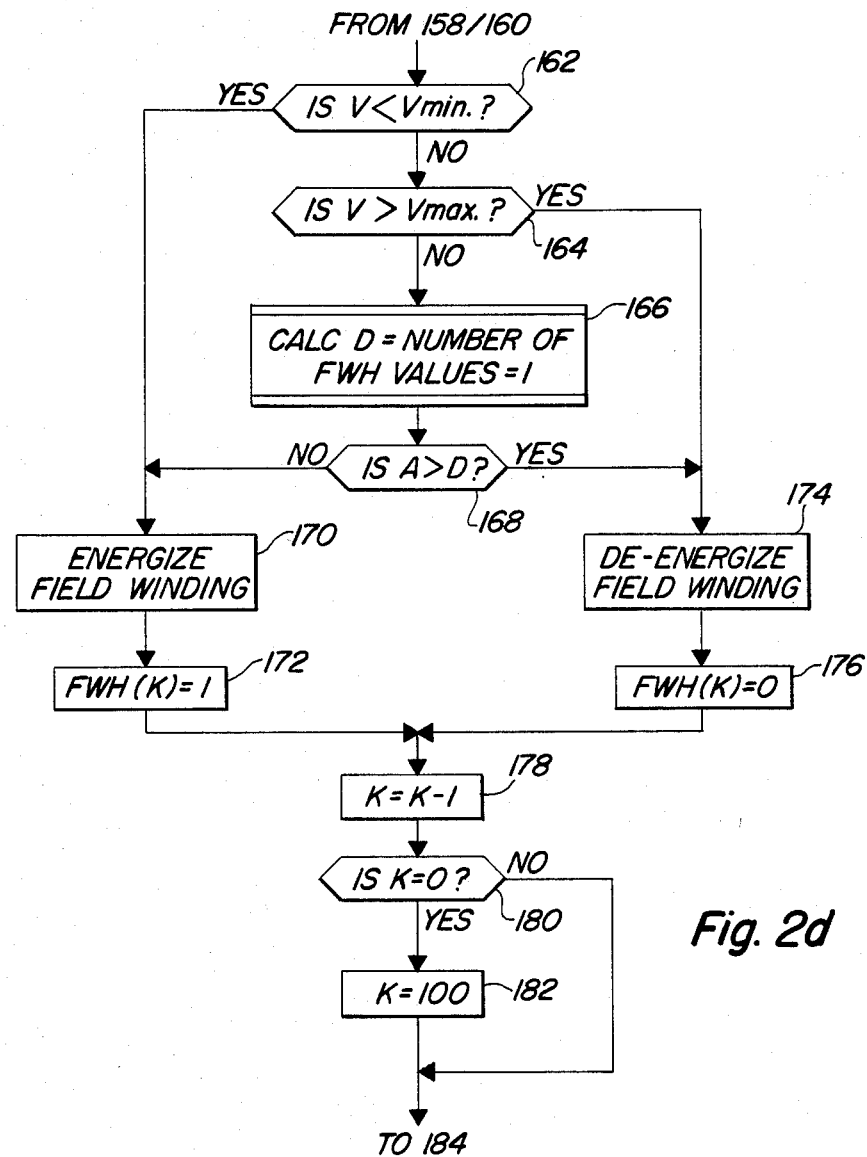
Figure 2E:
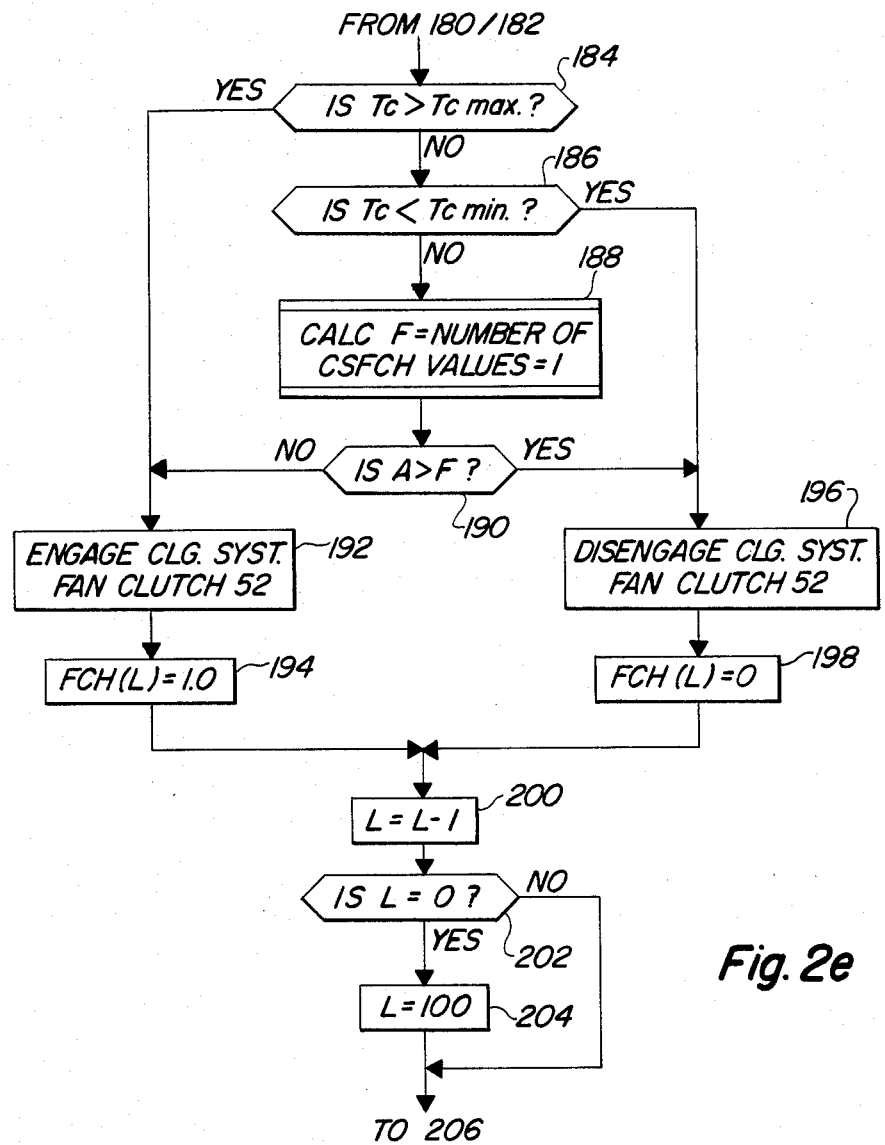
Figure 2F:
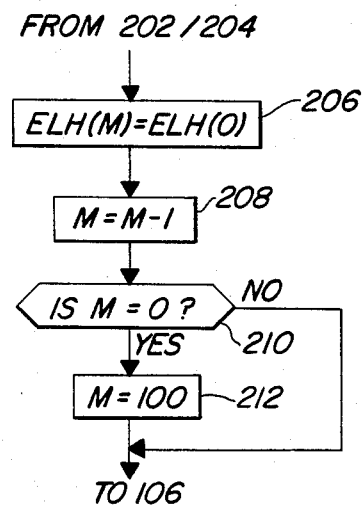

The control signals are generated by E.C.U. 40 as a function of the sensed temperatures, Te and Tc, the desired temperature, Td, the sensed engine load, Ld, air pressure, P, and voltage, V, according to the algorithm illustrated by the flow chart shown in FIGS. 2a-2f.

Referring now to FIGS. 2a-2f, the algorithm starts at 102. Then, at 104, various factors are initialized. A plurality of engine load history memory locations, ELH(1) through ELH(100), are initialized to some initial engine load value, such as 5. Other initial values would also work since in any case, the initial values will be rapidly replaced by actual sensed values through the repeated operation of the algorithm. Similarly, air conditioner compressor clutch history memory locations ACONH(1) through ACONH(100) are initialized, preferably to a value of 1.0, which represents an "on" or "engaged" condition of clutch 42. A clutch-disengaged state is represented by a value of 0.

Air compressor clutch history values ACOMH(1) through ACOMH(100) are initialized to 1.0 to represent an engaged condition of clutch 30. Values FWH(1) through FWH(100) are initialized to 1.0 to represent an energized condition of alternator field winding 36. The cooling system fan clutch history values FCH(1) through FCH(100) are initialized at 1.0 to represent an engged status of fan clutch 52. It should be pointed out that the particular number of these various history memory locations is not critical as long as it is understood that more memory locations yield better resolution at an increased cost. A reasonable number of memory locations would be from 10 to 100. The example described herein will be based upon 100 history memory locations for each variable. Finally, the variable indexing integers I, J, K, L and M are initialized equal to 100.

It should be pointed out that the E.C.U. 40 also contains various pre-programmed values, such as Tv, representing an allowable variation in the temperature of compartment 14. Vmax and Vmin represent the maximum and minimum, respectively, of the battery voltage, V. Pmax and Pmin represent the maximum and minimum allowed pressure in accumulator 26. Tmax and Tmin represent the maximum and minimum, respectively, of the engine coolant temperature.

In step 108, counter values A and N are both set equal to 1. Then, step 110 determines if ELH(N) is less than ELH(0). If yes, the algorithm proceeds to step 112 where the counter value A is increased by 1. If not, the algorithm proceeds to step 116 where N is compared to 100. If N is not equal to 100, N is increased by 1 at step 114, then the algorithm returns to step 110. Thus, steps 108 through 116 operate so that the counter value A will be equal to the number of engine load history values which are greater than the current load history value ELH(0). Thus, the number A can be described as a loading factor or a ranking factor which represents a comparison or ranking of the current engine load with respect to the recent history of the engine loading.

If Te is greater than Td+Tv, then step 118 directs the algorithm to step 126, while if Te is less than Td−Tv, then step 120 directs the algorithm to step 128. Otherwise, the algorithm proceeds to routine 122.

Routine 122 is the same as steps 108–116, except that a counter value B is set equal to the number of history values for clutch 42, ACOHN, which are equal to 1. Thus, B can be described as an activity or usage factor which is a historical measure of the engagement status of air conditioner compressor clutch 42 and represents the proportion of the time that the air conditioning compressor clutch must be engaged to keep the environment within the desired temperature limits. If A is not greater than B, then step 124 directs the algorithm to step 126. Otherwise, step 124 directs the algorithm to step 128. Step 126 causes clutch 42 to be engaged, after which step 130 sets ACONH(I)=1. Step 128 causes disengagement of clutch 42, after which step 132 sets ACONH(I)=0. Thus, the engagement of clutch 42 is controlled as a function of a comparison involving the current engine load history ranking and the recent engine loading history and the recent engagement history of clutch 42 (proportion of time engaged).

From steps 130 or 132, the algorithm proceeds to step 134 which decrements the index I by 1. Then, if the index I is not equal to 0, step 136 directs the algorithm to step 140, else, the algorithm proceeds to step 138 which sets I equal to 100.

In this manner, steps 126, 130 and 134–138 or steps 128, 132 and 134–138 operate to place a 1 or a 0 in the oldest or Ith ACONH memory location. Then, the index I is decremented so that through repetition of the algorithm, the oldest history value for clutch 42 is replaced with a value corresponding to the current status of the engagement of clutch 42, as determined by step 126 or 128.

In steps 140 and 142, the accumulator pressure value P is compared to Pmin and Pmax values, respectively. If P is less than Pmin, then step 140 directs the algorithm to step 148. If P is greater than Pmax, then step 142 directs the algorithm to step 152. Otherwise, the algorithm proceeds to routine 144. Routine 144 is also the same as steps 108–116, except that a counter value C is set equal to the number history values for air compressor clutch 30, ACOMH, which are equal to 1 (indicating clutch engagement). Thus, C is a historical measure of the engagement status of air compressor clutch 30 and represents the proportion of the time that the air compressor clutch 30 must be engaged to maintain adequate pressure in the accumulator 26.

Then, if A is greater than C, step 146 directs the algorithm to steps 152 and 154. Otherwise, step 146 directs the algorithm to steps 148 and 150. Step 148 causes engagement of the air compressor clutch after which step 150 sets ACOMH(J) equal to 1. Step 152 causes disengagement of clutch 30 after which step 154 sets ACOMH(J) equal to 0. Thus, the engagement of clutch 30 is controlled as a function of a comparison involving the current engine load history ranking and the recent engagement history of air compressor clutch 30 (proportion of time engaged). Steps 156–160 operate the same as steps 134–138, except with index integer J, so that the history values for air compressor clutch 30 are updated so that the most recent clutch status value set in steps 150 to 154 replaces the oldest history value.

Step 162 directs the algorithm to step 170 if the battery voltage V is less than Vmin. Step 164 directs the algorithm to step 172 if V is greater than Vmax. Otherwise, the algorithm proceeds to routine 166. Routine 166, like steps 108–116 and routine 122 and 144, calculates D, the number of history values for the field winding 36, which indicate that the field winding is energized. Thus, D is a historical measure of the energization status of the alternator field winding 36 and represents the proportion of the time that the winding 36 is energized. Then, if A is greater than D, step 168 directs the algorithm to steps 172 and 174. Otherwise, step 168 directs the algorithm to steps 170 and 172. Step 170 energizes the field winding 36 and step 172 sets the current field winding history value, FWH(k) equal to 1. Step 174 de-energizes field winding 36 and step 176 sets FWH(k) equal to zero. Thus, the energization of field winding 36 is controlled as a function of a comparison involving the current engine load history ranking and the recent energization history of field winding 36 (proportion of time engaged).

Then, steps 178–182 operate the same as steps 134–138, except with index "k" so that the history values for the field winding are updated so that the most recent status history value FWH(k) set in steps 172 or 176 replaces the oldest field winding history value.

If the coolant temperature, Tc, is greater than Tcmax, then step 184 directs the algorithm to step 192. If Tc is less than Tcmin, then step 186 directs the algorithm to step 194. Otherwise, the algorithm proceeds to routine 188, which, like steps 108–116, determines the number F, which is equal to the number of history values for fan clutch 52 which represents an engaged status of fan clutch 52. Thus, F is an historical measure of the engagement status of fan clutch 52 and represents the proportion of the time that the fan clutch 52 is engaged. Then, if A is greater than F, step 190 directs the algorithm to steps 196 and 198. Otherwise, step 190 directs the algorithm to steps 192 and 194.

Step 192 engages fan clutch 52 and step 194 sets the current fan clutch history value FCH(L) equal to 1. Step 196 disengages clutch 52 and step 198 sets FCH(L) equal to 0. Thus, the engagement of fan clutch 52 is controlled as a function of a comparison involving the current engine load history ranking and the recent engagement history of fan clutch 52 (proportion of time engaged). Then, steps 200–204 operate on index L so that the oldest fan clutch history value is always replaced by the current value, as determined in steps 194 or 198.

Next, in step 206, the current engine load history value ELH(M) is set equal to the most recent engine load history value ELH(0) determined in previous step 106. Then, steps 208–212 operate with the index M so that the oldest engine load history value is always replaced with the newest engine load history value. In this manner, the engine load history values ELH(1) through ELH(100) will represent a continuously updated history of the engine load. After step 212, the algorithm returns to step 106 so that the sensed values can be updated before the next execution of the algorithm.

The conversion of the above-described flow chart into a standard language for implementing the algorithm described by the flow chart in a digital data processor, such as a microprocessor, will be evident to those with ordinary skill in the art.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:

1. A method for controlling the operation of an accessory driven by a vehicle engine, comprising:
    (a) periodically sensing loading of the engine and generating a plurality of engine load values representing the periodically sensed engine load;
    (b) storing a set of said load values in a corresponding first set of memory locations;
    (c) deriving an engine loading factor from the set of stored load values;
    (d) storing a set of activity values in a corresponding second set of memory locations, each activity value representing an activity status of the engine driven accessory;
    (e) deriving an accessory activity factor from the set of stored activity values;
    (f) comparing the engine loading factor with the accessory activity factor; and
    (g) activating or deactivating the accessory, depending upon the result of the comparison.

2. The method of claim 1, wherein:
the engine loading factor represents the number of the stored load values which are exceeded by a certain engine load value.

3. The method of claim 1, wherein:
the accessory activity factor represents the number of the stored activity values which are equal to a certain value.

4. The method of claim 1, further comprising:
after activating or deactivating the accessory, replacing an oldest one of the stored activity values with a new activity value representing the activity status of the accessory resulting from operation of step "(g)", 5. The method of claim 4, further comprising:
periodically replacing an oldest one of the stored engine load values with a most recent one of the load values generated by operation of step "(a)".

6. The method of claim 1, further comprising:
periodically sensing a temperature of the engine;
comparing the sensed temperature to a limit temperature; and
activating or deactiviating the accessory, depending upon the relationship between the sensed and limit temperatures.

7. The method of claim 1, wherein:
the accessory is an alternator which charges a vehicle battery, the alternator having a rotating field coil.

8. The method of claim 7, further comprising:
periodically sensing a voltage of the battery; and
energizing or de-energizing the field coil, depending upon a relationship between the sensed voltage and a limit voltage.

9. The method of claim 8, further comprising:
storing a set of energization values in a corresponding third set of memory locations, each energization value representing an energization status of the field coil;
deriving an energization factor from the set of stored energization values; and
energizing or de-energizing the field coil, depending upon a relationship between the engine loading factor and the energization factor.

10. The method of claim 9, further comprising:
after energizing or de-energizing the field coil, replacing an oldest one of the stored energization values with a new energization value representing the current energization status of the field coil.

11. The method of claim 1, wherein:
the accessory is an air compressor which pressurizes an accumulator.

12. The method of claim 1, further comprising:
periodically sensing a pressure in the accumulator; and
activating or de-activating the air compressor, depending upon a relationship between the sensed pressure and a limit pressure.

13. The method of claim 12, further comprising:
storing a set of operating values in a corresponding set of memory locations, each operating value representing an operational status of the air compressor;
deriving an air compressor operating factor from the set of stored operating values;
operating or disabling the air compressor, depending upon a relationship between the air compressor operating factor and the engine loading factor; and
after operating or disabling the air compressor, replacing an oldest one of the stored operating values with a new operating value representing the current operational status of the air compressor.

14. The method of claim 1, wherein:
the accessory is an engine-driven air conditioner compressor for compressing refrigerant in a vehicle air conditioning system which conditions an operator's compartment.

15. The method of claim 14, further comprising:
periodically sensing a temperature of the operator's compartment; and activating or de-activating the air conditioner compressor, depending upon a relationship between the sensed temperature and a limit temperature.

16. A method for controlling the operation of a vehicle air conditioning compressor driven by an engine via engageable and disengageable clutch, the method comprising:
   (a) periodically sensing loading of the engine and generating a plurality of engine load values, each representing the engine loading at a particular instant;
   (b) storing a set of said load values in a corresponding first set of memory locations;
   (c) deriving an engine loading factor from the set of stored load values;
   (d) storing a set of engagement values in a corresponding set of memory locations, each engagement value representing an engagement status of the clutch at a certain instant;
   (e) deriving an engagement history factor from the set of stored engagement values;
   (f) comparing the engine loading factor with the engagement history factor; and
   (g) controlling engagement of the clutch, depending upon the relationship between the compared factors.

17. The method of claim 16, wherein:
the engine loading factor represents the number of the stored load values which are exceeded by the engine load value most recently generated by step "(a)"; and
the engagement history factor represents the number of stored engagement values which are equal to a certain value.

* * * * *